No. 785,712.

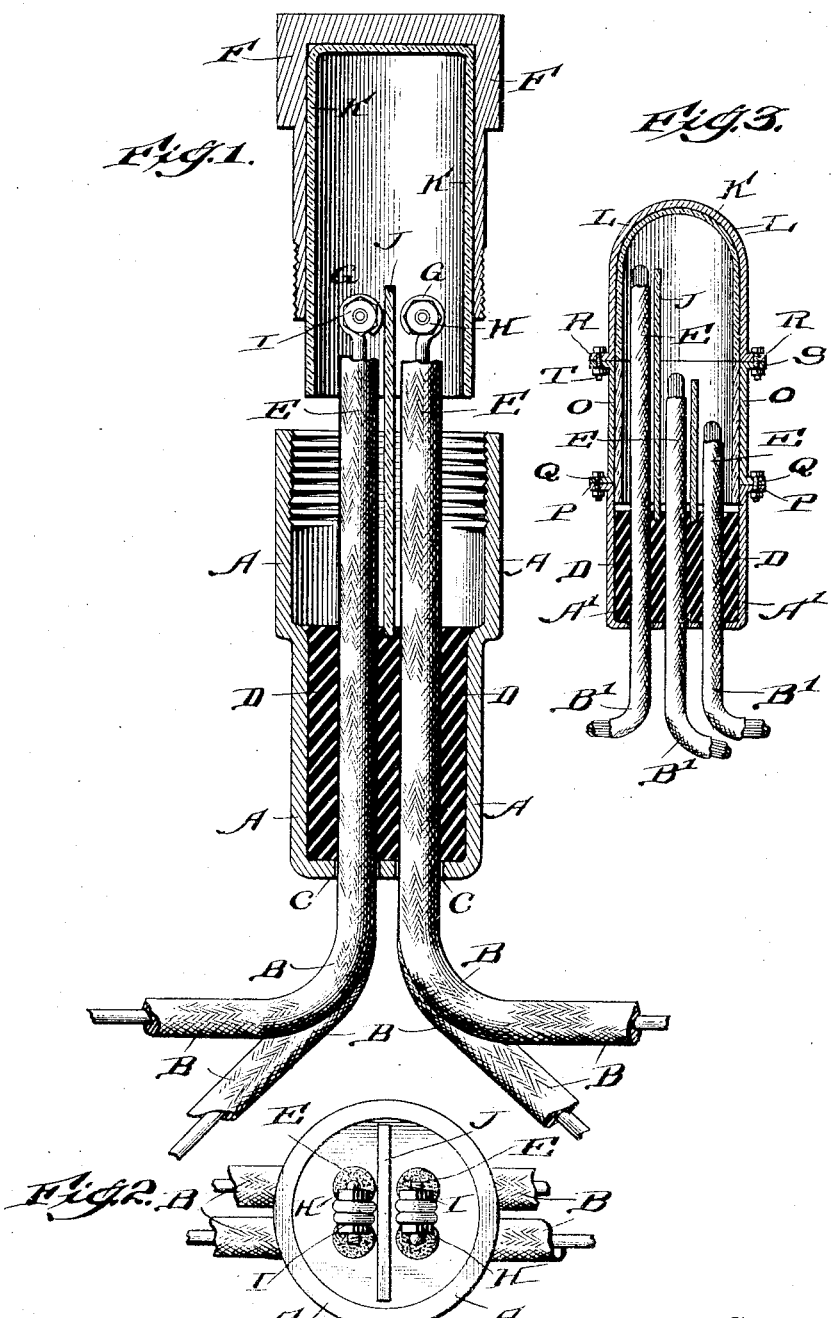

Patented March 28, 1905.

UNITED STATES PATENT OFFICE.

DONALD J. CHISHOLM, OF EAST HAMPTON, NEW YORK.

ELECTRIC-CABLE JOINT.

SPECIFICATION forming part of Letters Patent No. 785,712, dated March 28, 1905.

Application filed May 11, 1904. Serial No. 207,421.

*To all whom it may concern:*

Be it known that I, DONALD J. CHISHOLM, a citizen of the United States, and a resident of East Hampton, Long Island, New York, have invented certain new and useful Improvements in Electric-Cable Joints, of which the following is a specification accompanied by drawings.

This invention relates to electric-cable joints; and its objects are to improve upon such joints, simplify their construction, and enable the ends of any desired number of cables to be coupled and uncoupled and suitably tested by simply removing a protecting-cap from one end of the coupling-box, thereby exposing the cable ends to be reached.

Further objects of the invention will hereinafter appear; and to these ends the invention consists of an electric-cable joint embodying the features of construction, combinations of elements, and arrangement of parts having the general mode of operation substantially as hereinafter fully described and claimed in this specification and shown in the accompanying drawings, in which—

Figure 1 is a vertical sectional view of a cable-joint embodying the invention. Fig. 2 is a plan view of the same with the cap removed. Fig. 3 is a vertical sectional view of a modification.

Referring to the drawings, A represents a suitable coupling-box, which may be of any desired material, preferably of metal, as iron, and B represents electric cables entering one end of the box through suitable apertures C. Suitable filling material D, as tar, is provided around the cables and between them and the sides of the box A. The cable ends E, as shown, extend beyond the filling material D, so that they are exposed when the cap F is removed from the box, and suitable tests may be applied to the cables, or else they may be coupled in different combinations, as desired. In Figs. 1 and 2 the four cables are shown connected in pairs. As shown, the ends of the wires are bent in the form of loops or eyes G in the usual manner and held in electrical contact by means of the bolts H and nuts I. Preferably a sheet of suitable insulating material J, as glass, is arranged between the pairs of cable ends E, and preferably the cap F is lined with insulating material K, which may also be glass and adapted to extend a substantial distance along the length of the cable ends E, so that said ends are practically inclosed by insulating material on all sides. Any suitable means may be provided for removably securing the cap of the box A, in this instance interior screw-threads being provided upon the box and exterior coöperating threads upon the cap, although any other suitable means may be provided for the purpose. This device is particularly adapted to aluminium cables, which cannot be soldered.

In Fig. 3 a modified form of cable-joint is shown particularly adapted to cables containing a large number of conductors. By way of illustration three pairs of cables B are shown, and each pair projects a different distance beyond the filling material D in the box A', while the cap is made in sections, so that to expose the longest cable end E the outer section L of the cap only is removed. To expose the shorter sections of the cable ends E, both sections L and O of the cap should be removed. Any desired number of cables may be used in the construction shown in Fig. 3, and between each pair of cables is preferably arranged a sheet of insulating material J, as isinglass or paraffined paper. In this modification the box A' is provided with a flange P, while the section O of the cap has a coöperating flange Q, and the two are suitably secured together by means of the bolts R. The outer section L of the cap is also provided with a flange R, adapted to coöperate with the other flange, S, of the section O, while bolts T are provided at this portion of the cap. Preferably, as before, the inside of the cap is lined with insulating material K, such as glass.

Obviously some features of this invention may be used without others, and the invention may be embodied in widely-varying forms.

Therefore, without limiting the invention to the constructions shown and described nor enumerating equivalents, I claim, and desire to secure by Letters Patent, the following:

1. An electric-cable joint, comprising a coupling-box, cables entering one end thereof filling material around said cables in the box, the ends of the cables extending beyond the insulating material, a sheet of insulating material between the exposed ends of said cables, a cap for the coupling-box removably secured to the box, and a lining of insulating material for said cap, for substantially the purposes set forth.

2. An electric-cable joint, comprising a coupling-box, cables entering one end thereof, filling material around said cables in the box, the ends of the cables extending beyond the filling material, and a cap for the coupling-box removably secured to the box and formed in removable sections, for substantially the purposes set forth.

3. An electric-cable joint, comprising a coupling-box, cables entering one end thereof, filling material around said cables in the box, and a sectional cap for the coupling-box removably secured thereto, for substantially the purposes set forth.

4. An electric-cable joint, comprising a coupling-box, cables entering one end thereof, filling material around said cables in the box, and a sectional cap for the coupling-box removably secured thereto, with suitable insulation between the ends of the cables and in said sectional cap, for substantially the purposes set forth.

In testimony whereof I have signed this specification in the presence of two subscribing witnesses.

DONALD J. CHISHOLM.

Witnesses:
 E. VAN ZANDT,
 A. L. O'BRIEN.